US012560968B2

(12) United States Patent
Kishimoto et al.

(10) Patent No.: US 12,560,968 B2
(45) Date of Patent: Feb. 24, 2026

(54) DISPLAY APPARATUS AND METHOD OF MANUFACTURING THE SAME

(71) Applicant: Samsung Display Co., LTD., Yongin-si (KR)

(72) Inventors: Hirotsugu Kishimoto, Yongin-si (KR); Sungguk An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/388,833

(22) Filed: Nov. 11, 2023

(65) Prior Publication Data

US 2024/0176391 A1 May 30, 2024

(30) Foreign Application Priority Data

Nov. 29, 2022 (KR) ........................ 10-2022-0163249

(51) Int. Cl.
*G06F 1/16* (2006.01)
*G06F 1/18* (2006.01)

(52) U.S. Cl.
CPC ............ *G06F 1/1641* (2013.01); *G06F 1/181* (2013.01); *G06F 2200/1613* (2013.01); *G06F 2200/1635* (2013.01)

(58) Field of Classification Search
CPC .................. G06F 1/1641; G06F 1/181; G06F 2200/1613; G06F 2200/1635; G06F 1/1652; G09F 9/301; H04M 1/0237; H04M 1/0268; H10K 50/84; H10K 77/111; H10K 2102/311
See application file for complete search history.

(56) References Cited

U.S. PATENT DOCUMENTS

| | | | | |
|---|---|---|---|---|
| 9,614,168 | B2 * | 4/2017 | Zhang | H10K 85/141 |
| 9,983,424 | B2 * | 5/2018 | Kim | H10K 77/111 |
| 10,314,184 | B2 * | 6/2019 | Choi | G06F 1/1616 |
| 10,620,668 | B2 * | 4/2020 | Park | G09F 9/301 |
| 10,755,991 | B2 * | 8/2020 | Park | B32B 15/043 |
| 10,831,234 | B1 * | 11/2020 | Watamura | G06F 1/1652 |
| 10,930,883 | B2 * | 2/2021 | Park | H05K 5/0017 |

(Continued)

FOREIGN PATENT DOCUMENTS

| | | |
|---|---|---|
| KR | 1020210152318 A | 12/2021 |
| KR | 1020220007752 A | 1/2022 |

(Continued)

*Primary Examiner* — Rockshana D Chowdhury
(74) *Attorney, Agent, or Firm* — CANTOR COLBURN LLP

(57) ABSTRACT

A display apparatus includes: a display panel including a folding area and a non-folding area at opposite sides of the folding area, where the folding area includes a curvature area, an inflection area disposed at opposite sides of the curvature area, and an extension area between the curvature area and the inflection area; support portions disposed at a lower portion of the display panel, being spaced apart from each other with the folding area therebetween and overlapping the non-folding area; and a folding protection portion disposed between the support portions and including a different material from the support portions. A thickness of the folding protection portion is less than a thickness of the support portion, and the display panel is foldable in the folding area.

12 Claims, 13 Drawing Sheets

(56) References Cited

U.S. PATENT DOCUMENTS

| | | | | |
|---|---|---|---|---|
| 10,976,873 | B2* | 4/2021 | Shin | G06F 3/044 |
| 11,096,293 | B2* | 8/2021 | Park | H04M 1/0268 |
| 11,197,380 | B2* | 12/2021 | An | G09F 9/301 |
| 11,245,782 | B2* | 2/2022 | Hong | H04M 1/0268 |
| 11,258,035 | B2* | 2/2022 | Kim | G06F 1/1601 |
| 11,320,863 | B2* | 5/2022 | Shen | G06F 1/1652 |
| 11,395,415 | B2* | 7/2022 | Gu | G06F 1/1613 |
| 11,513,555 | B2 | 11/2022 | Lee et al. | |
| 11,546,986 | B2* | 1/2023 | Wang | H05K 1/028 |
| 11,662,780 | B2* | 5/2023 | Park | G06F 1/1681 |
| | | | | 361/679.01 |
| 11,696,412 | B2* | 7/2023 | Wu | G02F 1/133305 |
| | | | | 361/807 |
| 11,839,135 | B2* | 12/2023 | Zhao | G09F 9/30 |
| 11,868,176 | B2* | 1/2024 | Shin | G06F 1/1652 |
| 12,035,608 | B2* | 7/2024 | Kim | G06F 1/1652 |
| 12,041,735 | B2* | 7/2024 | Lee | G06F 1/1641 |
| 12,079,039 | B2* | 9/2024 | Kishimoto | G06F 1/1616 |
| 12,087,187 | B2* | 9/2024 | Afsar | G09F 9/301 |
| 12,161,042 | B2* | 12/2024 | Park | G09F 9/301 |

| | | | | |
|---|---|---|---|---|
| 2016/0357052 | A1* | 12/2016 | Kim | H10K 59/87 |
| 2019/0036068 | A1* | 1/2019 | Kim | H05K 1/147 |
| 2019/0204867 | A1* | 7/2019 | Song | G09G 3/3208 |
| 2019/0305238 | A1* | 10/2019 | Shin | H10K 59/87 |
| 2019/0334114 | A1* | 10/2019 | Park | H10K 50/8426 |
| 2019/0361285 | A1* | 11/2019 | Wang | G09F 9/301 |
| 2021/0068276 | A1* | 3/2021 | Kim | G06F 1/1652 |
| 2021/0141124 | A1* | 5/2021 | Park | H05K 5/0226 |
| 2021/0141418 | A1* | 5/2021 | Min | G06F 1/1637 |
| 2021/0217975 | A1* | 7/2021 | Gu | G09F 9/30 |
| 2022/0011814 | A1 | 1/2022 | Ryou et al. | |
| 2022/0075411 | A1* | 3/2022 | Lee | G06F 1/1616 |
| 2022/0129094 | A1* | 4/2022 | Tatsuno | G06F 3/046 |
| 2022/0404877 | A1* | 12/2022 | Sakamoto | G06F 1/1643 |
| 2023/0161377 | A1* | 5/2023 | Lee | G09F 9/301 |
| | | | | 361/679.01 |
| 2024/0221542 | A1* | 7/2024 | Li | G09F 9/301 |

FOREIGN PATENT DOCUMENTS

| | | |
|---|---|---|
| KR | 1020220031838 A | 3/2022 |
| KR | 1020220043668 A | 4/2022 |

* cited by examiner

DISPLAY APPARATUS AND METHOD OF MANUFACTURING THE SAME

This application claims priority to Korean Patent Application No. 10-2022-0163249, filed on Nov. 29, 2022, and all the benefits accruing therefrom under 35 U.S.C. § 119, the content of which in its entirety is herein incorporated by reference.

BACKGROUND

1. Field

One or more embodiments relate to a display apparatus and a method of manufacturing the display apparatus, and more particularly, to a foldable display apparatus and a method of manufacturing the foldable display apparatus.

2. Description of the Related Art

An electronic apparatus has been widely used. The electronic apparatus is used in various ways, such as a mobile electronic apparatus and a fixed electronic apparatus, and the electronic apparatus includes a display apparatus capable of providing visual information such as an image or an image to a user so as to support various functions.

As other components for driving the display apparatus have been miniaturized, the ratio of the display apparatus in the electronic apparatuses is gradually increasing, and display apparatuses having a structure that is bent to have a certain angle in a flat state or folded with respect to an axis, have also been developed.

The foldable display apparatus can be folded or unfolded with respect to a folding axis. In this case, a structure in which the display apparatus is folded in a dumbbell shape, may be considered.

The background technology described above is technical information obtained by the inventor of the present disclosure or obtained in the derivation process of the present disclosure, and is not necessarily known to the general public prior to the application of the present disclosure.

SUMMARY

One or more embodiments include a display apparatus having no complex structure and being robust to impact and a method of manufacturing the display apparatus.

However, these problems are examples, and the scope of the present disclosure is not limited thereby.

Additional aspects will be set forth in part in the description which follows and, in part, will be apparent from the description, or may be learned by practice of the presented embodiments of the disclosure.

According to one or more embodiments, a display apparatus includes: a display panel including a folding area and a non-folding area at opposite sides of the folding area, where the folding area includes a curvature area, an inflection area disposed at opposite sides of the curvature area, and an extension area between the curvature area and the inflection area; first support portions disposed at a lower portion of the display panel, being spaced apart from each other with the folding area therebetween and overlapping the non-folding area; and a folding protection portion disposed between the first support portions and including a different material from the first support portions. A thickness of the folding protection portion is less than a thickness of the first support portion, and the display panel is foldable in the folding area.

The thickness of the folding protection portion may be less than or equal to ½ of a thickness of the first support portion.

The thickness of the first support portion may be about 200 micrometers (μm) to about 1000 μm.

The thickness of the folding protection portion may be about 10 μm to about 100 μm.

The modulus of the folding protection portion may be about 100 megapascals (MPa) to 10 gigapascals (GPa).

The first support portion may include a glass material, and the folding protection portion may include at least one of acryl, urethane, epoxy, silicon, and polyimide.

The folding protection portion may include a first folding protection portion disposed at a lower portion of the display panel in the folding area and a second folding protection portion disposed at a lower portion of the first folding protection portion.

The modulus of the first folding protection portion may be about 0.01 MPa to about 1 MPa, and the modulus of the second folding protection portion may be about 100 MPa to about 10 GPa.

The thickness of the first folding protection portion may be less than or equal to ½ of the thickness of the second folding portion.

The display apparatus may further include a folding support portion disposed at a lower portion of the folding protection portion.

The display apparatus may further include a slit plate disposed between the folding protection portion and the folding support portion and including a plurality of opening patterns.

The non-folding area may include a first non-folding area at one side and a second non-folding area at the other side with respect to the folding area, the display panel may further include a bending area connected to the first non-folding area and bent, and a pad area connected to the bending area and disposed to face the first non-folding area, and the first support portion may include a first support member disposed to correspond to the first non-folding area, a second support member disposed to correspond to the second non-folding area, and a third support member disposed to correspond to the pad area.

According to one or more embodiments, a method of manufacturing a display apparatus includes: preparing a base substrate; forming a display panel on the base substrate, where the display panel comprises a non-folding area at opposite sides of the folding area and a bending area at one side of the non-folding area; forming a first support portion by etching and removing a portion of the base substrate; and disposing a folding protection portion in a space obtained by removing the portion of the base substrate.

The thickness of the non-folding protection portion may be less than or equal to ½ of the thickness of the first support portion.

The thickness of the first support portion may be about 200 μm to 1000 μm, and the thickness of the folding protection portion may be about 10 μm to about 100 μm.

The modulus of the folding protection portion may be about 100 MPa to about 10 GPa.

The first support portion may include a glass material, and the folding protection portion may include at least one of acryl, urethane, epoxy, silicon, and polyimide.

The etching and removing of the portion of the base substrate may include etching the base substrate in an area corresponding to the folding area and the bending area.

The disposing of the folding protection portion may include disposing the folding protection portion at a lower portion of the display panel in the folding area.

The disposing of the folding protection portion may include disposing a first folding protection portion at a lower portion of the display panel in the folding area, and disposing a second folding protection portion at a lower portion of the first folding protection portion.

The modulus of the first folding protection portion may be less than the modulus of the second folding protection portion.

Other aspects, features, advantages other than those described above will become apparent from the following drawings, claims, and detailed description of the invention.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
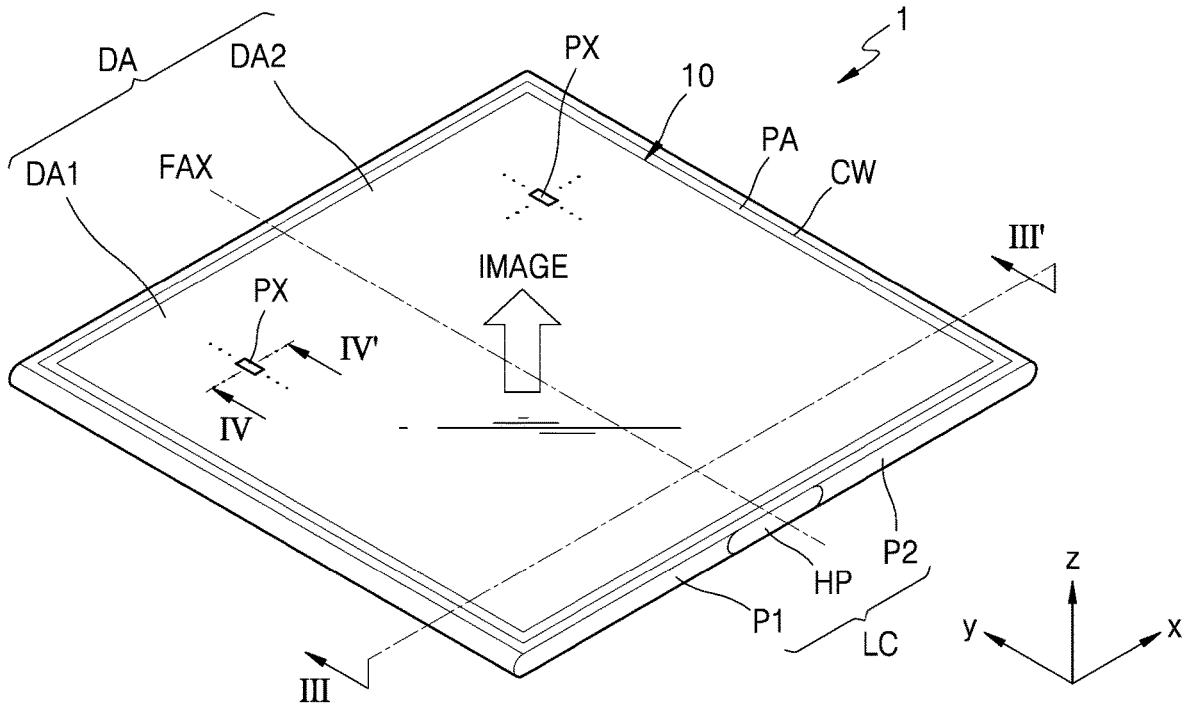
FIGS. 1 and 2 are perspective views schematically illustrating a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Since various modifications and various embodiments of the present disclosure are possible, specific embodiments are illustrated in the drawings and described in detail in the detailed description. Effects and features of the present disclosure, and a method of achieving them will be apparent with reference to embodiments described below in detail in conjunction with the drawings. However, the present disclosure is not limited to the embodiments disclosed herein, but may be implemented in a variety of forms.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described in detail with reference to the accompanying drawings, and the same or corresponding components are denoted by the same reference numerals, and the same reference numerals are assigned and redundant explanations will be omitted.

In the following embodiment, the terms of the "first" and "second", etc. were used for the purpose of distinguishing one component from other components, not a limited sense.

In the following embodiment, the singular expression includes a plurality of expressions unless the context is clearly different.

In the following embodiment, the terms such as comprising or having are meant to be the features described in the specification, or the components are present, and the possibility of one or more other features or components will be added, is not excluded in advance.

In the following embodiment, when a portion such as a layer, a region, a component or the like is on other portions, this is not only when the portion is on other components, but also when other components are interposed therebetween.

In the drawings, for convenience of explanation, the sizes of components may be exaggerated or reduced. For example, since the size and thickness of each component shown in the drawings are arbitrarily indicated for convenience of explanation, the present disclosure is not necessarily limited to the illustration.

In the following embodiments, the x-axis, the y-axis, and the z-axis are not limited to three axes on a Cartesian coordinate system, and may be interpreted in a broad sense including the same. For example, the x-axis, the y-axis, and the z-axis may be perpendicular to each other, but may refer to different directions that are not orthogonal to each other.

In the case where some embodiments may be implemented in the present specification, a specific process order may be performed differently from the order described. For example, two processes described in succession may be substantially performed at the same time, or in an opposite order to an order to be described.

Figure 2:
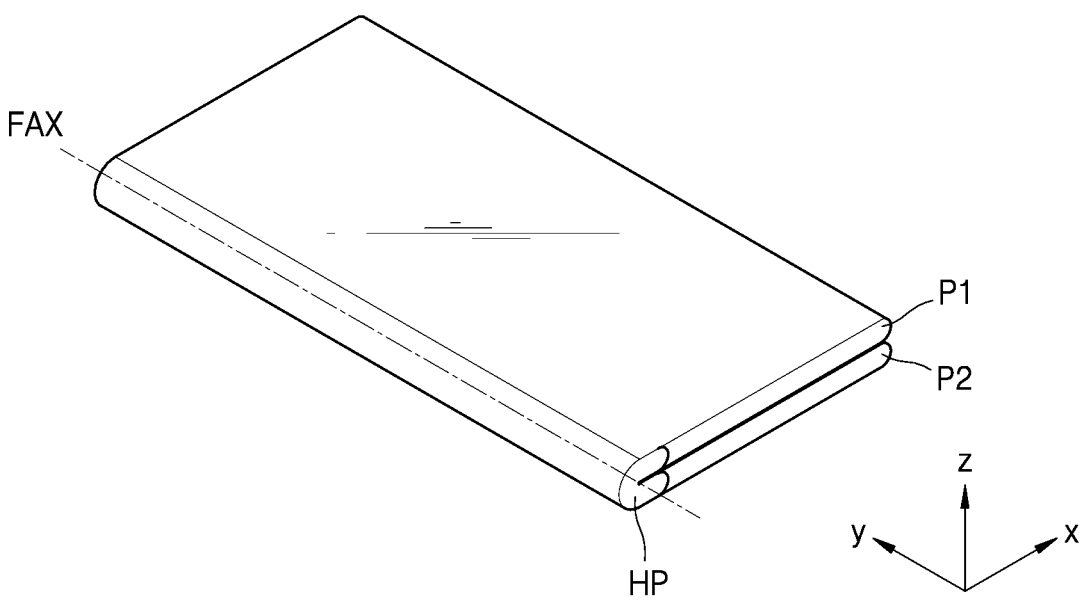

FIGS. 1 and 2 are perspective views schematically illustrating a display apparatus 1 according to an embodiment. Specifically, FIG. 1 illustrates a state in which the display apparatus 1 is unfolded, and FIG. 2 illustrates a state in which the display apparatus 1 is folded.

Referring to FIGS. 1 and 2, the display apparatus 1 may be an apparatus for displaying a moving image or a still image, and may be used as a display screen of various electronic apparatuses such as televisions, laptop computers, monitors, advertisement boards, Internet of Things ("IoT") apparatuses, in addition to portable electronic apparatuses, for example, a mobile phone, a smart phone, a tablet personal computer ("PC"), a mobile communication terminal, an electronic notebook, an electronic book, a portable multimedia player ("PMP"), a navigation system, and an ultra mobile PC (PC). Also, the display apparatus 1 according to an embodiment may be used in an electronic apparatus such as a smart watch, a watch phone, a glasses type display, or a head mounted display ("HMD"), for example, a wearable device. In addition, the display apparatus 1 according to an embodiment may be used as a display of an electronic device, for example, a dashboard of a vehicle, and a center information display ("CID") display disposed on a center fascia or a dashboard of a vehicle, a room mirror display for replacing a side mirror of a vehicle, and a display disposed on a rear surface of the front seat as an entertainment for a rear sheet of a vehicle.

The display apparatus 1 may have an approximately rectangular shape, as shown in FIG. 1. In an embodiment, for example, the display apparatus 1 may be a generally rectangular planar shape having short sides extending in a first direction (e.g., x direction or −x direction) and long sides extending in a second direction (e.g., y direction or −y direction) as shown in FIG. 1. In one embodiment, a portion where a short side extending in a first direction (e.g., x direction or −x direction) meets a long side extending in a second direction (e.g., y direction or −y direction) may have a right-angle shape or a round shape having a certain curvature. Of course, the planar shape of the display apparatus 1 is not limited to a rectangular shape but may be another polygonal shape, a circular shape or an elliptical shape.

The display apparatus 1 may include a lower cover LC, a display panel 10, and a cover window CW.

The lower cover LC may constitute the appearance of a lower surface of the display apparatus 1. The lower cover LC may include plastic, metal or both plastic and metal. The lower cover LC may include a first portion P1 and a second portion P2 that support the display panel 10. The lower cover LC may be folded around a folding axis FAX defined between the first portion P1 and the second portion P2. In an embodiment, the lower cover LC may further include a hinge portion HP, and the hinge portion HP may be disposed between the first portion P1 and the second portion P2.

The display panel 10 may include a display area DA and a peripheral area PA. In the display area DA, an image may be displayed. In this case, pixels PX may be arranged in the display area DA. The display panel 10 may provide an image by using light emitted from the pixels PX. Each of the pixels PX may emit light using a display element. In an embodiment, each pixel PX may emit red light, green light or blue light. In an embodiment, each pixel PX may emit red light, green light, blue light or white light.

The peripheral area PA may be an area in which no image is provided, and may be a non-display area. The peripheral area PA may surround at least a portion of the display area DA. In an embodiment, for example, the peripheral area PA may entirely surround the display area DA. A driving unit for providing an electrical signal to the pixels PX or a power line for providing power may be arranged in the peripheral area PA. For example, a scan driving unit for applying a scan signal to the pixels PX may be arranged in the peripheral area PA. In an embodiment, for example, a data driving unit for applying a data signal to the pixels PX may be arranged in the peripheral area PA.

The display area DA may include a first display area DA1 and a second display area DA2, which are arranged at opposite sides with respect to a folding axis FAX crossing the display area DA. The first display area DA1 and the second display area DA2 may be on a first portion P1 and a second portion P2 of the lower cover LC, respectively. The display panel 10 may provide a first image and a second image using pieces of light emitted from the plurality of pixels PX arranged in the first display area DA1 and the second display area DA2. In an embodiment, the first image and the second image may be portions of one image provided through the display area DA of the display panel 10. Alternatively, in an embodiment, the display panel 10 may provide a first image and a second image which are independent from each other.

The display panel 10 may be folded around the folding axis FAX. In an embodiment, when the display panel 10 is folded, the first display area DA1 and the second display area DA2 of the display panel 10 may face each other. In another embodiment, when the display panel 10 is folded, the first display area DA1 and the second display area DA2 of the display panel 10 may face opposite directions.

That is, in an embodiment, the display panel 10 may be in-folded or out-folded with respect to the folding axis FAX. Here, in-folding may mean that the display panel 10 is folded in +z direction with respect to the folding axis, and out-folding may mean that the display panel 10 is folded in −z direction with respect to the folding axis FAX. In other words, in-folding may mean that the upper surface of the cover window CW disposed on the display panel 10 is folded so as to face each other, and out-folding may mean that the lower surface of the cover window CW is folded so as to face each other. In this case, the lower surface of the cover window CW may mean a surface closer to the display panel (see 10 of FIG. 3) in z direction than the upper surface of the cover window CW.

FIGS. 1 and 2 illustrate a case where the folding axis FAX extends in a second direction (y direction), but embodiments are not limited thereto. In an embodiment, the folding axis FAX may extend in a first direction (x direction) crossing the second direction (y direction). Alternatively, on an x-y plane, the folding axis FAX may extend in a direction crossing the first direction (x direction) and the second direction (y direction).

In addition, FIGS. 1 and 2 illustrate a case where there is one folding axis FAX, but embodiments are not limited thereto. In another embodiment, the display panel 10 may be folded with respect to two folding axes FAX crossing the display area DA. In an embodiment, for example, when the display panel 10 is folded with respect to two folding axes FAX, the display panel 10 may be in-folded with respect to one folding axis FAX, and may be out-folded with respect to the remaining folding axis FAX. Alternatively, the display panel 10 may be in-folded or out-folded with respect to two folding axes FAX. In an embodiment, the display panel 10 may be folded with respect to a plurality of folding axes FAX crossing the display area DA. In this case, the display panel 10 may be in-folded or out-folded with respect to each folding axis FAX.

The cover window CW may be disposed on the display panel 10 and may cover the display panel 10. The cover window CW may be folded or bent according to an external force without the occurrence of cracks. When the display panel 10 is folded with respect to the folding axis FAX, the cover window CW may also be folded and may cover the display panel 10.

Figure 3:
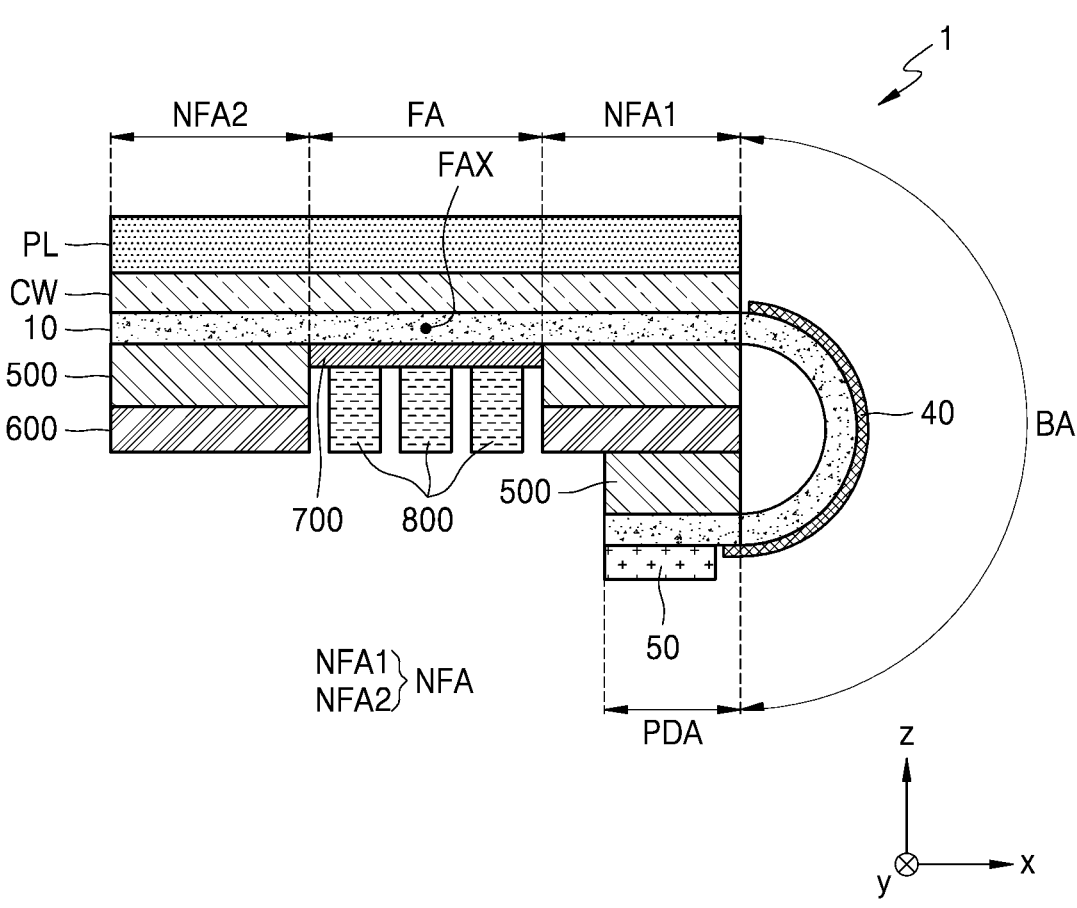
FIG. 3 is a cross-sectional view schematically illustrating a portion of the display apparatus according to an embodiment, which may correspond to a cross-section taken along a line III-III' of FIG. 1.

FIG. 3 is a cross-sectional view schematically illustrating a portion of a display apparatus according to another embodiment. FIG. 3 may correspond to a cross-section taken along a line III-III' of FIG. 1.

Referring to FIG. 3, the display apparatus 1 may include a display panel 10, a cover window CW, a protection layer PL, a first support portion 500, a second support portion 600, a folding protection portion 700, and a folding support portion 800.

The display apparatus 1 may include a folding area FA and a non-folding area NFA. The folding area FA and the non-folding area NFA may be areas that also extend in a thickness direction (e.g., z direction of FIG. 3) of the display apparatus 1. For example, the display panel 10 may also include the folding area FA and the non-display area NFA. The display apparatus 1, in particular, the display panel 10 may be folded with respect to the folding axis FAX in the folding axis FA.

The display panel 10 may display information to be processed by the display apparatus 1. In an embodiment, for example, the display panel 10 may display execution screen information of an application driven by the display apparatus 1 or user interface ("UI"), graphic user interface ("GUI") information according to the execution screen information.

The display panel 10 may include a display element. In an embodiment, for example, the display panel 10 may be an organic light emitting display panel using an organic light emitting diode, a micro light emitting diode display panel using a micro light emitting diode ("LED"), a quantum dot light emitting display panel using a quantum dot light emitting diode including a quantum dot light emitting layer, or an inorganic light emitting display panel using an inorganic light emitting device including an inorganic semiconductor. Hereinafter, a case where the display panel 10 is an organic light emitting display panel using an organic light emitting diode as a display element will be described in detail.

The cover window CW may be disposed on the display panel 10. The cover window CW may be configured to protect the display panel 10. In an embodiment, the cover window CW may be a flexible window. The cover window CW may be configured to protect the display panel 10 while being easily bent according to an external force without the occurrence of cracks. The cover window CW may include at least one of glass, sapphire, and plastic. The cover window CW may be, for example, ultra thin glass or colorless polyimide ("CPI").

The cover window CW may be attached to the display panel 10 by using an adhesive member. The adhesive member may be a pressure sensitive adhesive ("PSA"). The adhesive member may be a transparent adhesive member such as an optically clear adhesive ("OCA") film. The adhesive member may be formed in various ways such as being in a film shape to be attached to an upper portion (e.g., an upper portion of an encapsulation layer) of the display panel 10, or being formed in a material form to be applied to an upper portion of the display panel 10.

The protection layer PL may be disposed on the cover window CW. The protection layer PL may be disposed to cover one surface of the cover window CW to protect the cover window CW. Thus, the rigidity of the cover window CW may be reinforced.

In an embodiment, an optical functional layer and a touch sensor layer may be arranged between the display panel 10 and the cover window CW. In an embodiment, for example, the touch sensor layer may be disposed on the display panel 10. The touch sensor layer may be configured to attain coordinate information according to external input, for example, a touch event.

Also, although not shown, the optical functional layer may be disposed on the touch sensor layer. The optical functional layer may reduce reflectivity of light (external light) incident onto the display apparatus from the outside and/or may improve color purity of light emitted from the display apparatus. In an embodiment, the optical functional layer may include a retarder and/or a polarizer. The retarder may be of a film type or a liquid crystal coating type and may include a $\lambda/2$ retarder and/or a $\lambda/4$ retarder. The polarizer may also be of a film type or a liquid crystal coating type. The film type may include an elongated synthetic resin film, and the liquid crystal coating type may include liquid crystals arranged in a certain arrangement. The retarder and the polarizer may further include a protective film.

The non-folding area NFA of the display panel 10 may include a first non-folding area NFA1 in one side (e.g., +x direction in FIG. 3) and a second non-folding area NFA2 in the other side (e.g., −x direction in FIG. 3) with respect to the folding area FA. That is, the first non-folding area NFA1 may be disposed at a first side of the folding area FA, the second non-folding area NFA2 may be disposed at a second side of the folding area FA, and the first side is opposite to the second side with respect to the folding area FA.

The display panel 10 may include a bending area BA extending from one of the first non-folding area NFA1 and the second non-folding area NFA2, and a pad area PDA connected to the bending area BA. Hereinafter, for convenience of explanation, a case where the bending area BA and the pad area PDA are connected to the first non-folding area NFA1, will be mainly described.

The display panel 10 may be bent in the bending area BA. In this case, at least a portion of lower surfaces of the display panel 10 may face each other, and the pad area PDA of the display panel 10 may be at a lower position (in −z direction of FIG. 3) than other portions of the display panel 10. Thus, the area of a non-display area visible to a user may be reduced.

The bending protection portion 40 may be disposed in the bending area BA. The bending protection portion 40 may prevent damage of the display panel 10 when the display panel 10 is bent. In detail, the bending protection portion 40 may protect the bending area BA from external shock and may alleviate the stress of the bending area BA. Also, the position of a neutral plane may be advantageously adjusted so that stress applied to the display panel 10 may be minimized.

Driving units for applying a scan signal or data signal may be arranged in the pad area PDA. In an embodiment, for example, a display driving unit may be disposed in the pad area PDA, and control signals and power supply voltages may be applied to the display driving unit, and the display driving unit may generate signals and voltages for driving the display panel 10 and may output them. The display driving unit may include an integrated circuit.

The display circuit board 50 may be electrically connected to the display panel 10. In an embodiment, for example, the display circuit board 50 may be in contact with the pad area PDA of the display panel 10 to be connected thereto, or may be electrically connected to the pad area PDA of the display panel 10 by using an anisotropic conductive film.

The display circuit board 50 may be a flexible printed circuit board ("FPCB") which may be bent or a rigid printed circuit board ("PCB") which is firmly and easily bent. Alternatively, in some cases, the display circuit board 50 may be a composite PCB including both a FPCB and a rigid PCB.

In an embodiment, a touch sensor driving unit may be disposed on the display circuit board 50. The display driving unit may include an integrated circuit ("IC"). The touch sensor driving unit may be attached to the display circuit board 50. The touch sensor driving unit may be electrically connected to sensor electrodes of a touch sensor layer of the display panel 10 through the display circuit board 50.

Of course, besides, a power supply unit may be additionally disposed on the display circuit board 50. The power supply unit may supply a driving voltage for driving the pixels and the display driving unit of the display panel 10.

The first support portions 500 may be disposed under the display panel 10. The first support portions 500 may support the display panel 10. Also, the first support portions 500 may protect the display panel 10 from external shock. The first support portions 500 may be arranged to be spaced apart from each other by a distance of the folding area FA in the first direction (x direction) so as not to correspond to the folding area FA. That is, the first support portions 500 may correspond to the non-folding area NFA. This is to fold the display panel 10 in a dumbbell shape when the display panel 10 is folded.

Also, the first support portions 500 may not be disposed to correspond to the bending area BA but may correspond to the pad area PDA. Thus, as shown in FIG. 3, at least a portion of the first support portions 500 may overlap each other on a plan view. In other words, a portion and another portion of the first support portions 500 may be arranged to face each other. As used herein, the "plan view" is a view in a thickness direction (z direction).

The second support portion 600 may be disposed under the first support portion 500. The second support portion 600 may protect the display panel 10 from external shock together with the first support portion 500. In addition, the second support portion 600 may prevent the occurrence of bending in the display panel 10 due to various members such as a display circuit board 50 which may be arranged at a lower portion of the display panel 10.

In an embodiment, the second support portion 600 may be arranged to be spaced apart from each other by a distance of the folding area FA so as not to correspond to the folding area FA. That is, the second support portion 600 may correspond to the non-folding area NFA. This is to fold the display panel 10 in a dumbbell shape when the display panel 10 is folded.

The folding protection portion 700 may be disposed in the lower portion of the display panel 10 in the folding area FA. The folding protection portion 700 may protect the display panel 10 from shock in the folding area FA. This will be described below in detail.

The folding support portion 800 may be disposed under the folding protection portion 700. The folding support portion 800 may support the display panel 10 in the folding area FA. This will be described below in detail.

Figure 4:
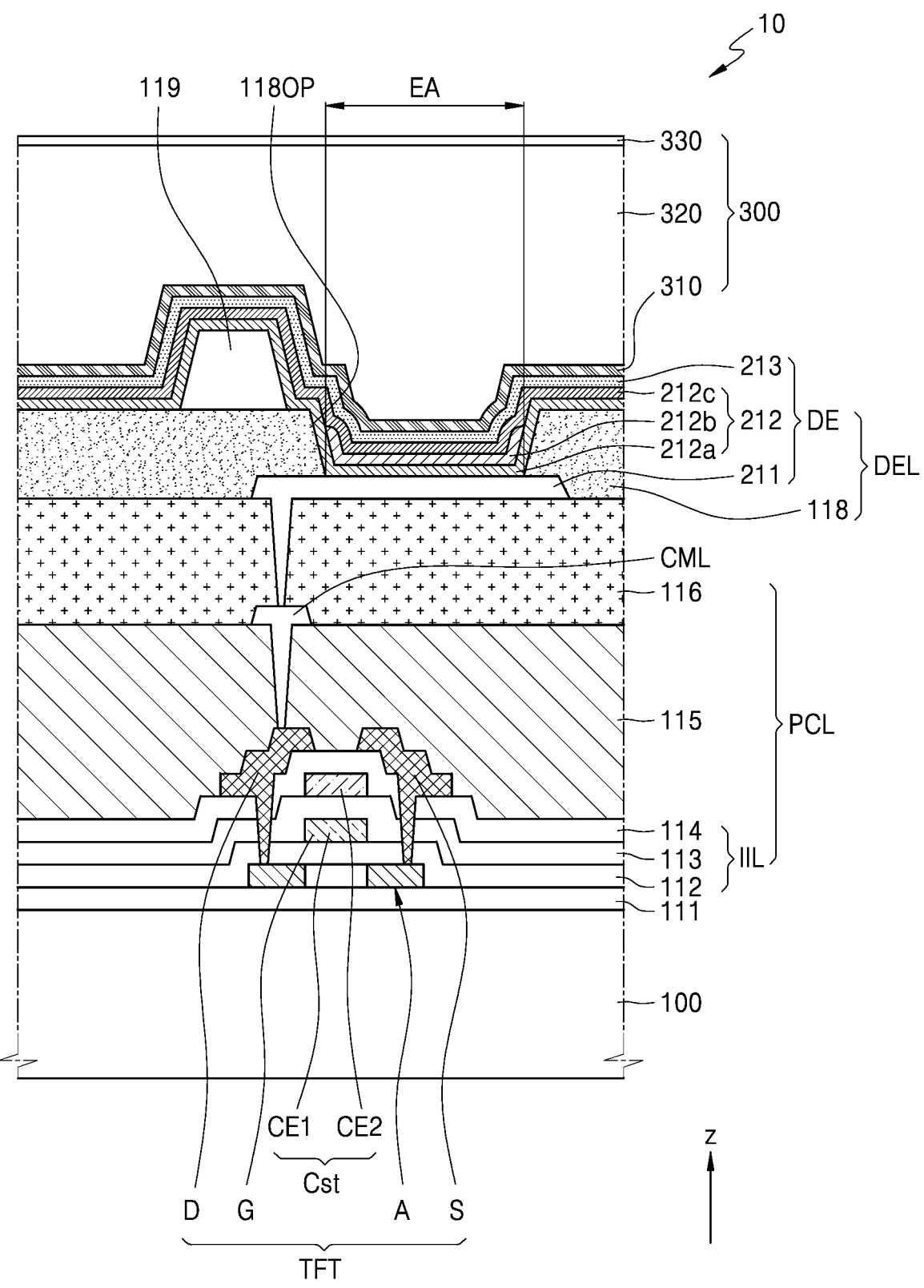
FIG. 4 is a cross-sectional view schematically illustrating a display panel according to an embodiment, which enlarges the display panel of FIG. 3.

FIG. 4 is a cross-sectional view schematically illustrating a portion of the display apparatus according to an embodiment, which may correspond to a cross-section taken along a line IV-IV' of FIG. 1.

Referring to FIG. 4, the display panel 10 may include a substrate 100, a buffer layer 111, a pixel circuit layer PCL, a display element layer DEL, and an encapsulation layer 300.

The substrate 100 may include a polymer resin such as glass, polyethersulfone, polyarylate, polyether imide, polyethylene naphthalate, polyethylene terephthalate, polyphenylene sulfide, polyimide, polycarbonate, cellulose triacetate, cellulose acetate propionate, etc. In an embodiment, the substrate 100 may have a multi-layered structure including a base layer including the above-described polymer resin and a barrier layer (not shown). The substrate 100 including polymer resin may have flexible, rollable, bendable characteristics.

A buffer layer 111 may be disposed on the substrate 100. The buffer layer 111 may include an inorganic insulating material such as silicon nitride, silicon oxynitride, and silicon oxide, and may have a single layer or multi-layered structure including the above-described inorganic insulating material.

The pixel circuit layer PCL may be disposed on the buffer layer 111. The pixel circuit layer PCL may include a thin film transistor TFT included in a pixel circuit, an inorganic insulating layer IIL, a first planarization layer 115, and a second planarization layer 116, which are arranged under or/and on components of the thin film transistor TFT. The inorganic insulating layer IIL may include a first gate insulating layer 112, a second gate insulating layer 113, and an interlayer-insulating layer 114.

The thin film transistor TFT may include a semiconductor layer A, and the semiconductor layer A may include polysilicon. Alternatively, the semiconductor layer A may include amorphous silicon, an oxide semiconductor, an organic semiconductor, or the like. The semiconductor layer A may include a channel region, and a drain region and a source region, which are arranged at opposite sides of the channel region, respectively. The gate electrode G may overlap the channel region in a plan view.

The gate electrode G may include a low-resistance metal material. The gate electrode G may include a conductive material including molybdenum (Mo), aluminum (Al), copper (Cu), titanium (Ti) or the like, and may have a single layer or multi-layered structure including the above-described materials.

The first gate insulating layer 112 between the semiconductor layer A and the gate electrode G may include an inorganic insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx). The zinc oxide (ZnOx) may be zinc oxide (ZnO) and/or zinc peroxide (ZnOx).

The second gate insulating layer 113 may be provided to cover the gate electrode G. The second gate insulating layer 113 may include an inorganic insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnOx), similarly to the first gate insulating layer 112. The zinc oxide (ZnOx) may be zinc oxide (ZnO) and/or zinc peroxide (ZnOx).

An upper electrode CE2 of a storage capacitor Cst may be disposed above the second gate insulating layer 113. The upper electrode CE2 may overlap the gate electrode G thereunder in a plan view. In this case, the gate electrode G and the upper electrode CE2 that overlap each with the second gate insulating layer 113 may constitute the storage capacitor Cst of the pixel circuit. That is, the gate electrode G may function as the lower electrode CE1 of the storage capacitor Cst. In this way, the storage capacitor Cst and the thin film transistor TFT may overlap each other in a plan view. In some embodiments, the storage capacitor Cst may not overlap the thin film transistor TFT in a plan view.

The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W) and/or Cu, and may have a single layer or multi-layered structure including the above-described materials.

The interlayer-insulating layer 114 may be configured to cover the upper electrode CE2. The interlayer-insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide (ZnOx) may be zinc oxide (ZnO) and/or zinc peroxide (ZnOx). The interlayer-insulating layer 114 may have a single layer or multi-layered structure including the above-described inorganic insulating material.

Each of a drain electrode D and a source electrode S may be disposed on the interlayer-insulating layer 114. The drain electrode D and the source electrode S may include a material having good conductivity. The drain electrode D and the source electrode S may include a conductive material including Mo, Al, Cu, Ti or the like, and may have a single layer or multi-layered structure including the above-described materials. In an embodiment, the drain electrode D and the source electrode S may have a multi-layered structure of Ti/Al/Ti.

The first planarization layer 115 may be disposed to cover the drain electrode D and the source electrode S. The first planarization layer 115 may include an organic insulating layer. The first planarization layer 115 may include a general-purpose polymer such as polymethyl methacrylate ("PMMA") or polystyrene ("PS"), a polymer derivative having a phenolic group, an acrylic polymer, an alkene polymer, an aryl ether-based polymer, an amide-based polymer, a fluorine-based polymer, a p-xylene-based polymer, a vinyl alcohol-based polymer, and a blend thereof.

The connection electrode CML may be disposed on the first planarization layer 115. In this case, the connection electrode CML may be connected to the drain electrode D or the source electrode S through a contact hole of the first planarization layer 115. The connection electrode CML may include a material having good conductivity. The connection electrode CML may include a conductive material including Mo, Al, Cu, Ti or the like, and may have a single layer or multi-layered structure including the above-described materials. In an embodiment, the connection electrode CML may have a multi-layered structure of Ti/Al/Ti.

The second planarization layer 116 may be disposed to cover the connection electrode CML. The second planarization layer 116 may include an organic insulating layer. The second planarization layer 116 may include a general-purpose polymer such as PMMA or PS, a polymer derivative having a phenolic group, an acrylic polymer, an alkene polymer, an aryl ether-based polymer, an amide-based polymer, a fluorine-based polymer, a p-xylene-based polymer, a vinyl alcohol-based polymer, and a blend thereof.

The display element layer DEL may be disposed on the pixel circuit layer PCL. The display element layer DEL may include a display element DE. The display element DE may be an organic light emitting diode OLED. The pixel electrode 211 of the display element DE may be electrically connected to the connection electrode CML through a contact hole of the second planarization layer 116.

The pixel electrode 211 may include a conductive oxide such as indium tin oxide ("ITO"), indium zinc oxide ("IZO"), zinc oxide (ZnO), indium oxide ($In_2O_3$), indium gallium oxide ("IGO") or aluminum zinc oxide ("AZO"). In another embodiment, the pixel electrode 211 may include a reflective layer such as Ag, Mg, Al, Pt, Pd, Au, Ni, Nd, Ir, Cr, or a compound thereof. In another embodiment, the pixel electrode 211 may further include a layer formed of or including ITO, IZO, ZnO or $In_2O_3$ on/under the above-described reflective layer.

A pixel-defining layer 118 defining an opening 1180P therein for exposing the center of the pixel electrode 211 may be disposed on the pixel electrode 211. The pixel-defining layer 118 may include an organic insulating material and/or an inorganic insulating material. The opening

1180P may define an emission area (hereinafter, referred to as an emission area) EA of light emitted from the display element DE. In an embodiment, for example, the width of the opening 1180P may correspond to the width of the emission area EA of the display element DE.

In an embodiment, the pixel-defining layer 118 may include a light-blocking material and may be provided as black. The light-blocking material may include a resin or paste including carbon black, carbon nanotubes, and a black dye, metal particles, for example, nickel, aluminum, molybdenum, an alloy thereof, metal oxide particles (e.g., chromium oxide), or metal nitride particles (e.g., chromium nitride). When the pixel-defining layer 118 includes the light-blocking material, reflection of external light by metal structures disposed under the pixel-defining layer 118 may be reduced.

A spacer 119 may be disposed on the pixel-defining layer 118. The spacer 119 may prevent damage of the substrate 100 in the method of manufacturing the display apparatus. A mask sheet may be used to manufacture the display panel. In this case, when the mask sheet enters the opening 1180P of the pixel-defining layer 118 or a deposition material is deposited on the substrate 100 by being in close contact with the pixel-defining layer 118, defects in which a portion of the substrate 100 is damaged or destroyed by the mask sheet, may be effectively prevented from occurring.

The spacer 119 may include an organic insulating material such as polyimide. Alternatively, the spacer 119 may include an inorganic insulating material such as silicon nitride or silicon oxide, or may include an organic insulating material and an inorganic insulating material.

In an embodiment, the spacer 119 may include a different material from a material used to form the pixel-defining layer 118. In another embodiment, the spacer 119 may include the same material as the pixel-defining layer 118, and in this case, the pixel-defining layer 118 and the spacer 119 may be together formed in a mask process using a halftone mask or the like.

An intermediate layer 212 may be disposed on the pixel-defining layer 118. The intermediate layer 212 may include an emission layer 212b disposed in the opening 1180P of the pixel-defining layer 118. The emission layer 212b may include a polymer or small molecular weight organic material that emits light of a certain color.

A first functional layer 212a and a second functional layer 212c may be disposed under and on the emission layer 212b, respectively. The first functional layer 212a may include, for example, a hole transport layer ("HTL") or a HTL and a hole injection layer ("HIL"). The second functional layer 212c may be a component disposed on the emission layer 212b and may be optional. The second functional layer 212c may include an electron transport layer ("ETL") and/or an electron injection layer ("EIL"). The first functional layer 212a and/or the second functional layer 212c may be a common layer formed to entirely cover the substrate 100 like in the opposite electrode 213 to be described below.

The opposite electrode 213 may include a conductive material having a small work function. In an embodiment, for example, the opposite electrode 213 may include a (semi-)transparent layer including Ag, Mg, Al, Pt, Pd, Au, Ni, Nd, Ir, Cr, lithium (Li), calcium (Ca), or an alloy thereof. Alternatively, the opposite electrode 213 may further include a layer such as ITO, IZO, ZnO or $In_2O_3$ on the (semi-)transparent layer including the above-described materials.

In some embodiments, a capping layer (not shown) may be further disposed on the opposite electrode 213. The capping layer may include LiF, an inorganic material or/and an organic material.

The encapsulation layer 300 may be disposed on the opposite electrode 213. In an embodiment, the encapsulation layer 300 includes at least one inorganic encapsulation layer and at least one organic encapsulation layer, and FIG. 4 illustrates that the encapsulation layer 300 includes a first inorganic encapsulation layer 310, an organic encapsulation layer 320 and a second inorganic encapsulation layer 330, which are sequentially stacked to one another.

The first inorganic encapsulation layer 310 and the second inorganic encapsulation layer 330 may include one or more inorganic materials of aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include an acryl-based resin, an epoxy-based resin, polyimide, and polyethylene. In an embodiment, the organic encapsulation layer 320 may include acrylate.

Figure 5:
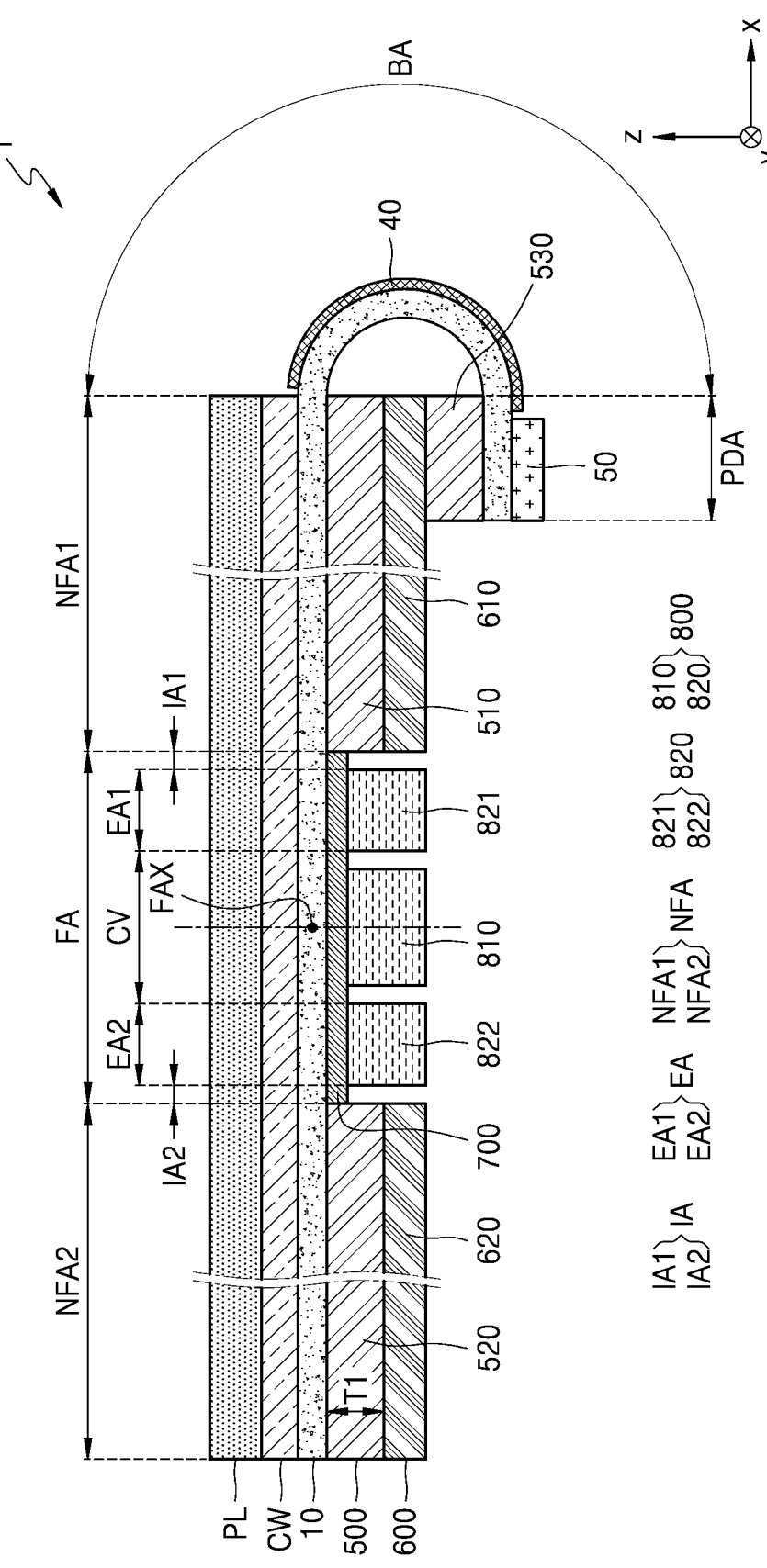
FIGS. 5 and 6 are cross-sectional views schematically illustrating a display apparatus according to an embodiment.
Figure 6:
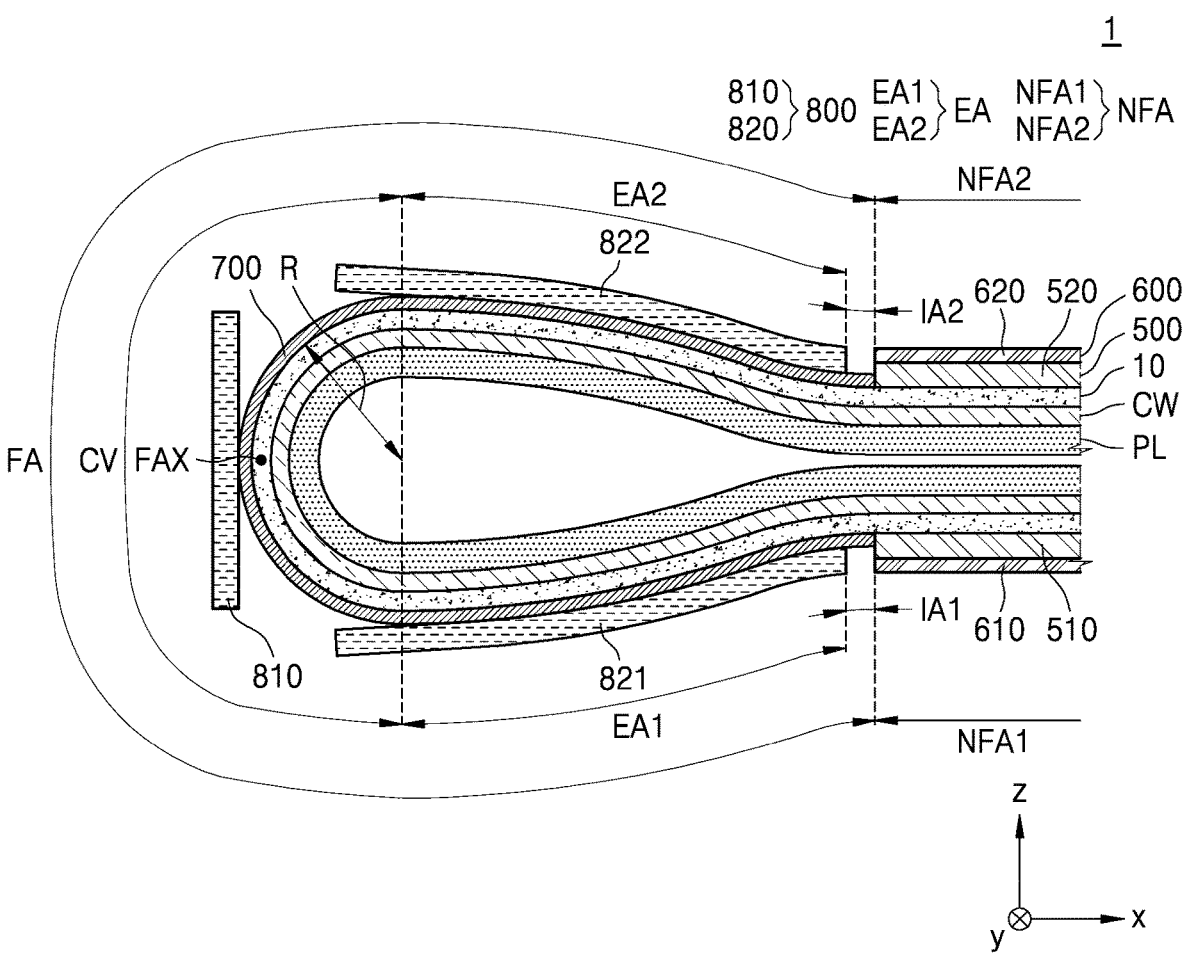

FIGS. 5 and 6 are cross-sectional views schematically illustrating the display apparatus 1 according to an embodiment. FIGS. 5 and 6 illustrate the display apparatus of FIG. 3 in more detail, and FIG. 5 illustrates a state in which the display apparatus 1 is unfolded, and FIG. 6 illustrates a state in which the display apparatus 1 is folded.

Referring to FIG. 5, the display apparatus 1 may include a folding area FA and a non-folding area NFA. The folding area FA and the non-folding area NFA may be areas that also extend in a thickness direction (e.g., z direction of FIG. 5) of the display apparatus 1 so that all layers in the display apparatus 1 may include the folding area FA and the non-folding area NFA. For example, the display panel 10 may also include the folding area FA and the non-display area NFA.

The folding area FA may be an area including the folding axis FAX and may be folded with having a certain curvature with respect to the folding axis FAX. In detail, the folding area FA may include a curvature area CV that is bent to have a certain curvature and substantially forms a portion of an arc in the folded state. Also, the folding area FA may include an extension area EA extending from opposite ends of the curvature area CV, for example, a first extension area EA1 connected to one end of the curvature area CV and a second extension area EA2 connected to the other end of the curvature area CV. The extension areas EA may have curved surfaces continuous with the curvature of the curvature area CV, and as shown in FIG. 6, the first extension area EA1 and the second extension area EA2 may be disposed to face each other when the display apparatus 1 is folded.

The non-folding area NFA may be connected to opposite ends of the folding area FA. The non-folding area NFA may be an area that is not substantially folded, i.e., is substantially planar. That is, the non-folding area NFA may be planar except for a portion adjacent to the folding area FA, or may be a surface having a significant curvature difference from the folding area FA so as to be close to a plane shape. The non-folding area NFA may include a first non-folding area NFA1 connected to the first extension area EA1, and a second non-folding area NFA2 connected to the second extension area EA2, and as shown in FIG. 6, the first non-folding area NFA1 and the second non-folding area NFA2 may be disposed to face each other when the display apparatus 1 is folded.

The display panel 10 may be folded in a dumbbell shape, as shown in FIG. 6. Specifically, the display panel 10 may be bent to have a certain curvature in the curvature area CV. The first extension area EA1 and the second extension area EA2 may extend to be closer to each other and to face each other as the first extension area EA1 and the second extension area EA2 get farther away from the curvature area CV. The first non-folding area NFA1 and the second non-folding area NFA2 may face each other and may be substantially parallel to each other in the folded state. The shape of the display panel 10 folded may be the same as the dumbbell shape.

The folding area FA and the non-folding area NFA may overlap the display area in a plan view (see DA of FIG. 1). In an embodiment, for example, the folding area FA may overlap portions of the first display area DA1 and the second display area DA2. Also, the first non-folding area NFA1 may overlap a portion of the first display area DA1, and the second non-folding area NFA2 may overlap a portion of the second display area DA2 in a plan view.

The folding area FA may further include an inflection area IA. The inflection area IA may be disposed at opposite ends of the folding area FA in a first direction (e.g., x direction of FIG. 5) of the folding area FA. The inflection area IA may be between the extension area EA and the non-folding area NFA. In an embodiment, the inflection area IA may include a first inflection area IA1 between the first extension area EA1 and the first non-folding area NFA1, and a second inflection area IA2 between the second extension area EA2 and the second non-folding area NFA2. Because the first inflection area IA1 and the second inflection area IA2 are similar to each other, hereinafter, the first inflection area IA1 will be described below as a representative example.

The first inflection area IA1 may be an inverse curvature portion in which a direction of curvature is changed to be opposite to the direction of the curvature of the curvature area CV and the first extension area EA1 when the display apparatus 1 is folded. In detail, the first inflection area IA1 may refer to an area in which the direction of the display apparatus 1 (e.g., the direction of a curved surface of the display panel 10) changes with respect to other part of the folding area FA when the display apparatus 1 is folded so that the folded display apparatus 1 may be in a dumbbell shape. That is, the display panel 10 may be bent in a concave direction in the curvature area CV and the first extension area EA1 of the folding area FA and may start to be bent in a convex direction in the first inflection area IA1.

The first support portion 500 may be disposed under the display panel 10. In an embodiment, the first support portion 500 may disposed to overlap the non-folding area NFA in a plan view. The first support portion 500 may include a first support member 510 at one side and a second support member 520 at the other side with respect to the folding area FA. The first support member 510 and the second support member 520 may be spaced apart from each other with the folding area FA therebetween. The first support member 510 may overlap to correspond to the first non-folding area NFA1, and the second support member 520 may overlap to correspond to the second non-folding area NFA2 in a plan view. In this way, the first support portion 500 may not be disposed in the folding area FA so that, when the display panel 10 is folded, the display panel 10 may be more easily folded in a dumbbell shape.

Also, the first support portion 500 may further include a third support member 530 that overlaps to correspond to the pad area PDA in a plan view. The third support member 530 may be disposed on a lower surface of the display panel 10 in the pad area PDA, and the display panel 10 may be bent in the bending area BA so that, as the pad area PDA is disposed at a lower portion than other portions of the display panel 10, the third support member 530 may overlap to face the first support member 510 in a plan view.

In an embodiment, the first support portion 500 may include a glass material.

In an embodiment, a thickness T1 of the first support portion 500 may be 200 micrometers (μm) or more and 1000 μm or less. When the thickness T1 of the first support portion 500 is greater than 1000 μm, the thickness of the display apparatus 1 may increase, and the weight of the display apparatus 1 may increase. When the thickness of the first support portion 500 is less than 200 μm, the first support portion 500 may not pass through a drop test. The drop test may be a test in which the display apparatus 1 is dropped at a certain height to measure whether the display apparatus 1 is damaged by drop shock. That is, when the thickness of the first support portion 500 is less than 200 μm, cracks of the display apparatus 1, for example, the display panel 10 may occur due to external shock such as drop.

In an embodiment, the display panel 10, in particular, the substrate (see 100 of FIG. 4) may be disposed on the first support portion 500 to come into contact with the first support portion 500. In other words, an adhesive member may not be disposed between the first support portion 500 and the substrate 100. This may be implemented in such a way that, in a manufacturing process of the display apparatus 1, the substrate 100 may be formed on the first support portion 500.

The second support portion 600 may be disposed under the first support portion 500. In an embodiment, the second support portion 600 may be adhered to the first support portion 500 by using the adhesive member. The second support portion 600 may be disposed to overlap the non-folding area NFA in a plan view similarly to the first support portion 500. The second support portion 600 may include a fourth support member 610 at one side and a fifth support member 620 at the other side with respect to the folding area FA. The fourth support member 610 and the fifth support member 620 may be spaced apart from each other with the folding area FA therebetween. The fourth support member 610 may overlap to correspond to the first non-folding area NFA1, and the fifth support member 620 may overlap to correspond to the second non-folding area NFA2 in a plan view. In this case, the fourth support member 610 may be disposed between the first support member 510 and the third support member 530. In this way, the second support portion 600 may not be disposed in the folding area FA so that the display panel 10 may be more easily folded in a dumbbell shape when the display panel 10 is folded.

In an embodiment, the second support portion 600 may include at least one of a metal material and a cushion material. The second support portion 600 may support and protect the first support portion 500 on the second support portion 600 and the display panel 10.

The folding protection portion 700 may be disposed in the lower part of the display panel 10 in the folding area FA. The folding protection portion 700 may be disposed between the first support member 510 and the second support member 520. The folding protection portion 700 may be disposed to overlap the folding area FA, in detail, the curvature area CV, the extension area EA, and the inflection area IA. The folding protection portion 700 may facilitate folding of the display panel 10 in the folding area FA and may protect the display panel 10.

In an embodiment, the folding protection portion 700 may include at least one of acryl, urethane, epoxy, silicon, and polyimide. Also, the folding protection portion 700 and the first support portion 500 may include different materials from each other.

In an embodiment, the thickness of the folding protection portion 700 in the thickness direction (z direction) may be about 10 μm to about 100 μm. When the thickness of the folding protection portion 700 is less than about 10 μm or greater than about 100 μm, the folding protection portion 700 may not pass through a folding test. The folding test may be a test in which the display apparatus 1 are repeatedly folded and unfolded by a certain number of times to measure whether the display panel 10 is damaged. That is, when the thickness of the folding protection portion 700 is less than about 10 μm, cracks of the display apparatus 1, for example, cracks of the display panel 10 may occur due to repeated folding and unfolding. When the thickness of the folding protection portion 700 is greater than 100 μm, buckling of the display apparatus 1, for example, buckling of the display panel 10 may occur due to repeated folding and unfolding.

In this case, the thickness of the folding protection portion 700 may be less than or equal to ½ of the thickness of the first support portion 500. In this way, the folding protection portion 700 disposed at a lower portion of the folding area FA and the first support portion 500 disposed at a lower portion of the non-folding area NFA may be formed of or include different materials from each other, and as the thickness of the folding protection portion 700 is formed to be less than or equal to ½ of the thickness of the first support portion 500, the display panel 10 may be more easily folded in a dumbbell shape when the display panel 10 is folded.

In addition, in one embodiment, the modulus of the folding protection portion 700 may be about 100 megapascals (MPa) to about 10 gigapascals (GPa). When the modulus of the folding protection portion 700 is less than about 100 MPa or greater than about 10 GPa, the folding protection portion 700 may not pass through a folding test. That is, when the modulus of the folding protection portion 700 is less than about 100 MPa, cracks of the display apparatus 1, for example, cracks of the display panel 10 may occur due to repeated folding and unfolding. When the modulus of the folding protection portion 700 is less than about 10 GPa, buckling of the display apparatus 1, for example, buckling of the display panel 10 may occur due to repeated folding and unfolding.

The folding support portion 800 may be disposed under the folding protection portion 700. The folding support portion 800 may support the display panel 10 in the folding area FA and may prevent sagging of the display panel 10. In addition, in the folding area FA, an empty space under the folding protection portion 700, between the first support member 510 and the second support member 520 and between the fourth support member 610 and the fifth support member 620 may be filled with the folding support portion 800 so that a step height occurred due to the first support portion 500 and the second support portion 600 may be compensated for.

In an embodiment, the folding support portion 800 may include a central plate 810 and a wing plate 820. The central plate 810 may be located in the center of the folding area FA. The wing plate 820 may include a first wing plate 821 at one side and a second wing plate 822 at the other side with respect to the central plate 810 in the first direction (x direction). Lower surfaces of the central plate 810, the first wing plate 821 and the second wing plate 822 may be disposed in substantially the same plane as the lower portion of the second support portion 600. Thus, a step height at a boundary between the non-folding area NFA and the folding area FA in the thickness direction may be effectively prevented from occurring.

Figure 7:
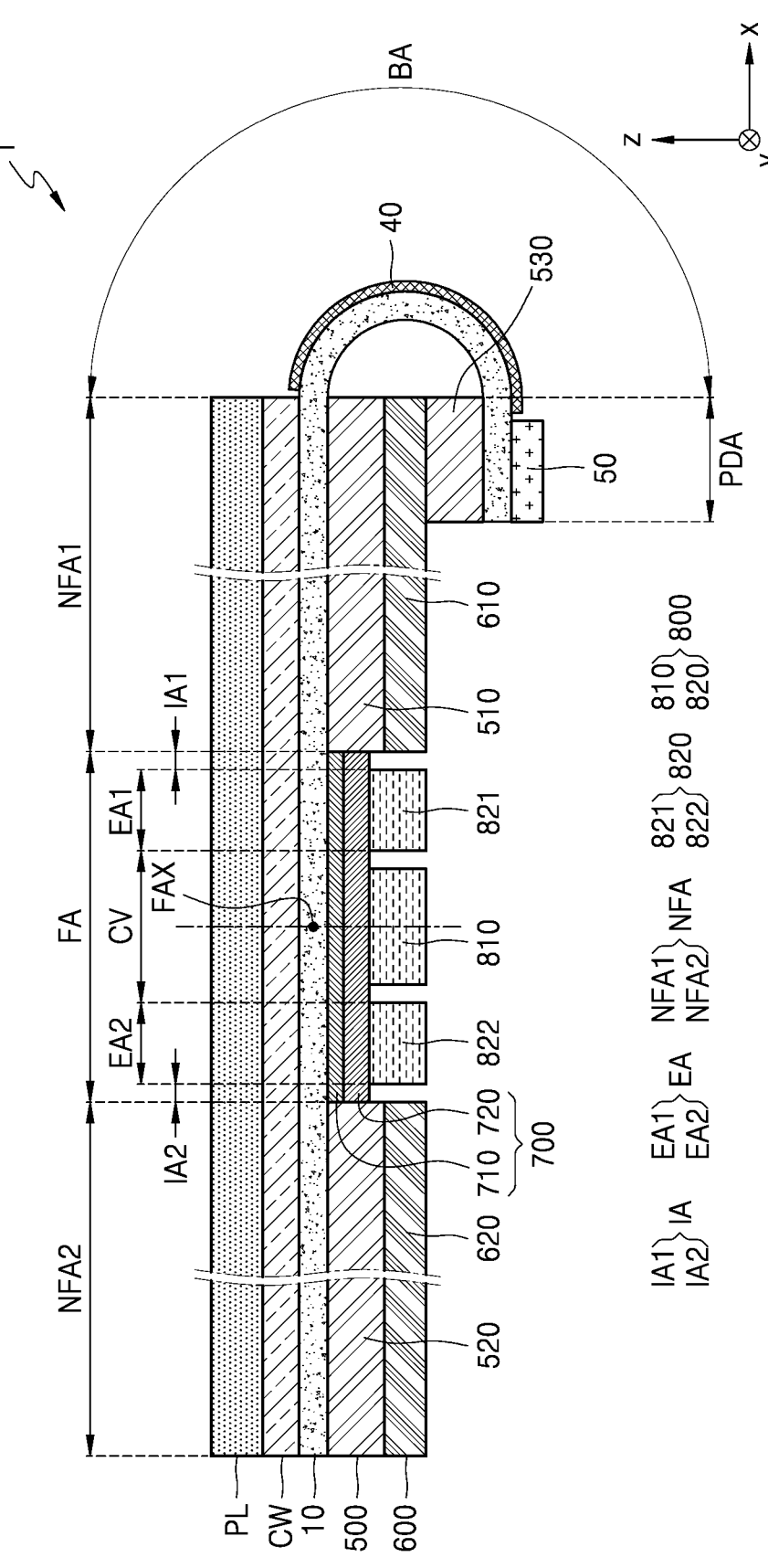
FIG. 7 is a cross-sectional view schematically illustrating a display apparatus according to another embodiment.

FIG. 7 is a cross-sectional view schematically illustrating a display apparatus 1 according to another embodiment. Because the display apparatus 1 of FIG. 7 is similar to the above-described display apparatus, hereinafter, only a difference therebetween will be described.

Referring to FIG. 7, in an embodiment, the folding protection portion 700 may have a multi-layered structure of two or more layers. In an embodiment, for example, the folding protection portion 700 may include a first folding protection portion 710 and a second folding protection portion 720.

The first folding protection portion 710 may be disposed at a lower portion of the display panel 10 in the folding area FA. The first folding protection portion 710 may be disposed between the first support member 510 and the second support member 520. The first folding protection portion 710 may be disposed to overlap the folding area FA, in detail, the curvature area CV, the extension area EA, and the inflection area IA.

The second folding protection portion 720 may be disposed under the first folding protection portion 710. The second folding protection portion 720 may be disposed to overlap the first folding protection portion 710 in the folding area FA. The second folding protection portion 720 may be disposed between the first support member 510 and the second support member 520. The second folding protection portion 720 may be disposed to overlap the folding area FA, in detail, the curvature area CV, the extension area EA, and the inflection area IA.

In this case, in an embodiment, the first folding protection portion 710 may include acryl, and the second folding protection portion 720 may include at least one of acryl, urethane, epoxy, silicon, and polyimide.

In an embodiment, the thickness of the first folding protection portion 710 may be less than the thickness of the second folding protection portion 720. In an embodiment, for example, the thickness of the first folding protection portion 710 may be less than or equal to ½ of the thickness of the second folding protection portion 720. For example, the thickness of the first folding protection portion 710 may be about 20 μm, and the thickness of the second folding protection portion 720 may be about 50 μm.

In an embodiment, the modulus of the first folding protection portion 710 may be less than the modulus of the second folding protection portion 720. In an embodiment, for example, the modulus of the first folding protection portion 710 may be about 0.01 MPa to about 1 MPa. The modulus of the second folding protection portion 720 may be about 100 MPa to 10 GPa. In this way, as the first folding protection portion 710 is formed of a soft material and the second folding protection portion 720 is formed of a hard material, folding in the folding area FA may be easily performed, and damage of the display panel 10 may be effectively prevented.

Figure 8:
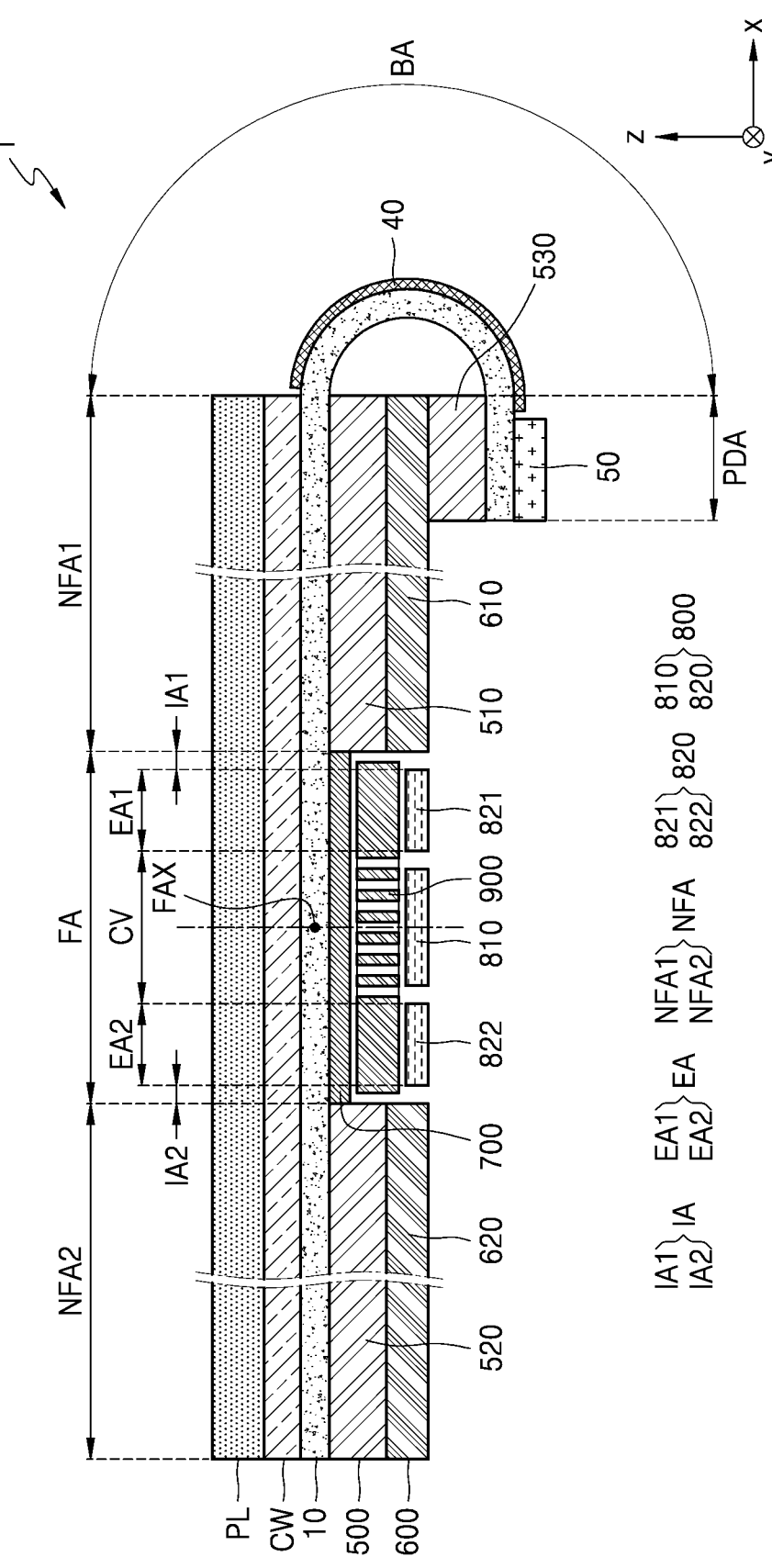
FIG. 8 is a cross-sectional view schematically illustrating a display apparatus according to another embodiment.

FIG. 8 is a cross-sectional view schematically illustrating a display apparatus 1 according to still another embodiment. Because the display apparatus 1 of FIG. 8 is similar to the above-described display apparatus, hereinafter, only a difference therebetween will be described.

Referring to FIG. 8, the display apparatus 1 may further include a slit plate 900 disposed between the folding protection portion 700 and the folding support portion 800. The slit plate 900 may be disposed to overlap the folding area FA in a plan view and may be disposed between the first support member 510 and the second support member 520.

In an embodiment, the slit plate 900 may include an opening pattern defining a plurality of openings therein. In an embodiment, for example, the opening pattern may define a plurality of openings spaced apart from each other in a first direction (e.g., x direction of FIG. 8). Each of the plurality of openings may extend in a second direction (e.g., y direction of FIG. 8).

In an embodiment, the slit plate 900 may be disposed between the folding protection portion 700 and the folding support portion 800 to correspond to the folding area FA, in detail, the curvature area CV, the extension area EA, and the inflection area IA. In this case, the opening pattern having the plurality of openings may be disposed to correspond to the curvature area CV. In other words, the slit plate 900 may be disposed to overlap the curvature area CV, the extension area EA, and the inflection area IA, and the opening pattern may be disposed to overlap the curvature area CV in a plan view. However, embodiments are not limited thereto, and in an alternative embodiment, the opening pattern may be formed throughout the slit plate 900 so that the opening pattern may be disposed to overlap the curvature area CV, the extension area EA, and the inflection area IA in a plan view.

In an embodiment, the lower surface of the slit plate 900 may be disposed in substantially the same plane as the lower surface of the first support portion 500. In this case, the lower surface of the folding support portion 800 may disposed in be substantially the same plane as the lower surface of the second support portion 600. The slit plate 900 may extend in the folding area FA when the display apparatus 1 is folded, together with the folding protection portion 700, thereby facilitating folding.

In an embodiment, the slit plate 900 may include a metal material, and embodiments are not limited thereto.

FIGS. 9 through 13 are views schematically illustrating a method of manufacturing a display apparatus according to an embodiment. In an embodiment, the method of manufacturing the display apparatus may be used to manufacture the above-described display apparatus 1 but embodiments are not limited thereto.

Figure 9:
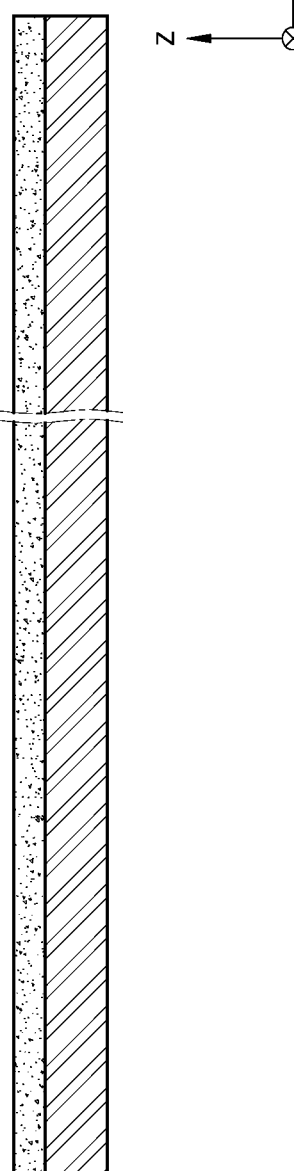
FIGS. 9 through 13 are views schematically illustrating a method of manufacturing a display apparatus according to an embodiment.

Referring to FIG. 9, a base substrate 400 may be prepared. In an embodiment, the base substrate 400 may include a glass material.

A substrate (see 100 of FIG. 4) may be formed on the base substrate 400, and various layers may be stacked on the substrate 100. That is, the display panel 10 may be formed on the base substrate 400. In this case, the substrate 100 may be formed on the base substrate 400 through thermal curing. Thus, the base substrate 400 and the substrate 100 may be connected to each other without using the adhesive member between the base substrate 400 and the substrate 100.

Figure 10:
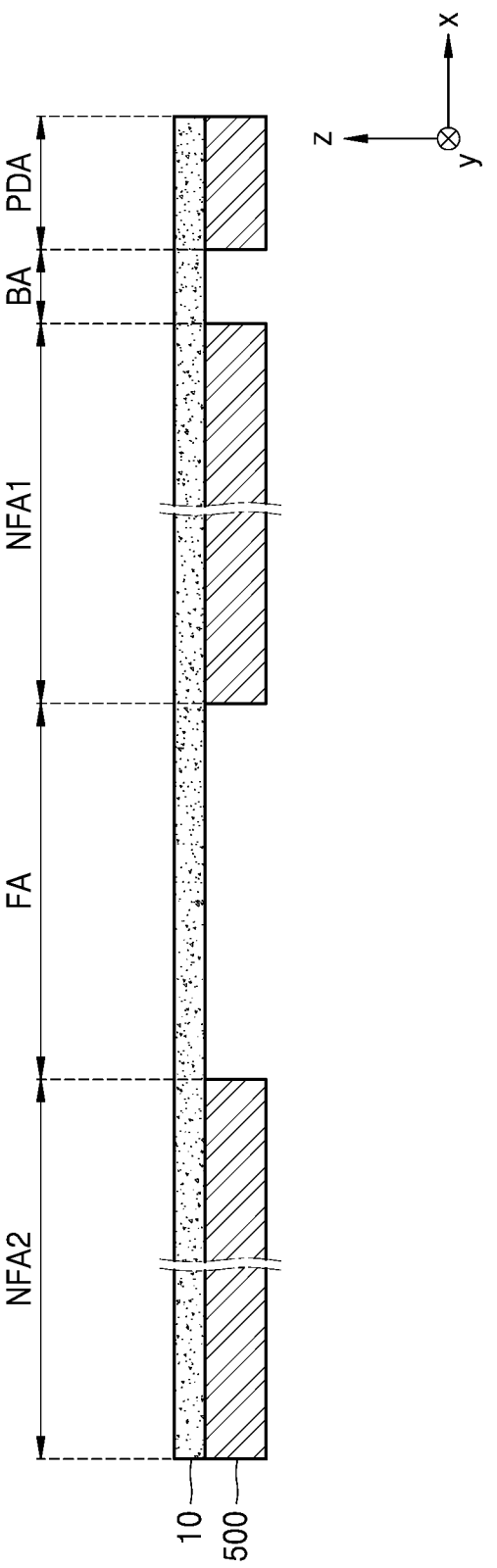

Referring to FIG. 10, a portion of the base substrate 400 may be etched. In detail, the base substrate 400 corresponding to the folding area FA may be etched and removed. In detail, the base substrate 400 corresponding to the bending area BA may be etched and removed. Accordingly, the base substrate 400 may form a first support portion 500. In an embodiment, the first support portion 500 may include a first support member 510 disposed to correspond to the first non-folding area NFA1, a second support member 520 disposed to correspond to the second non-folding area NFA2, and a third support member 530 disposed to correspond to the pad area PDA.

Figure 11:
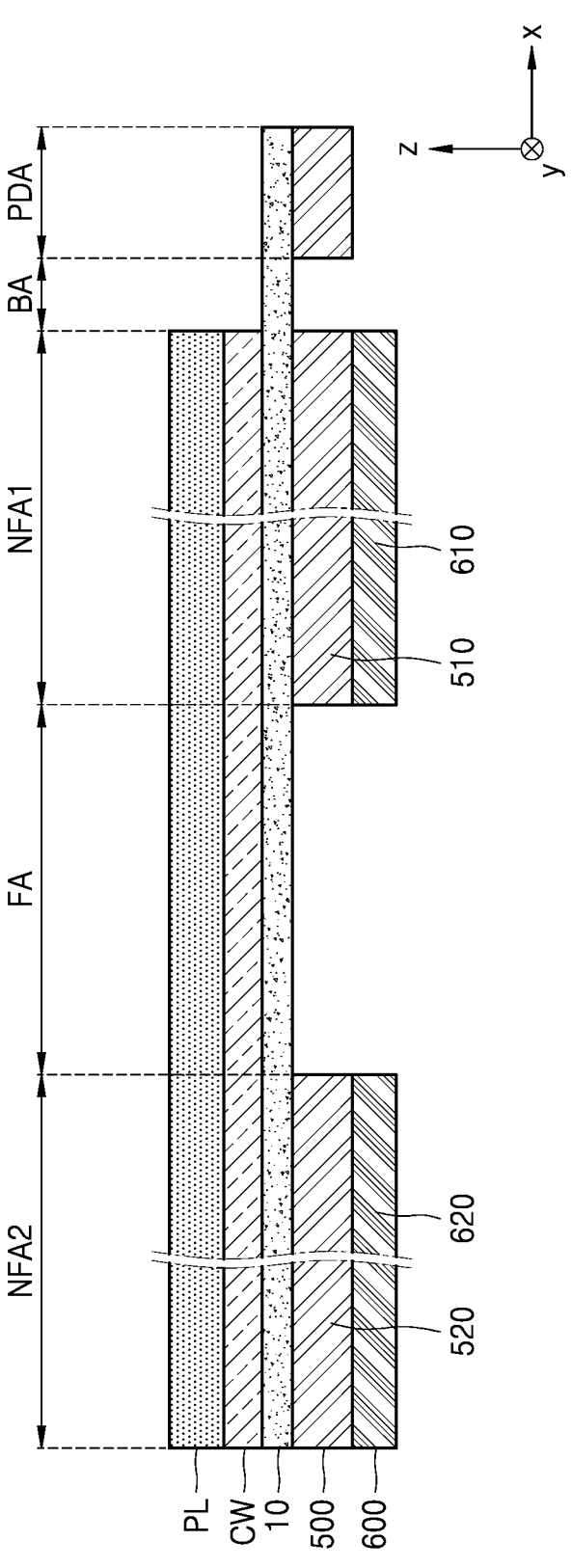

Referring to FIG. 11, a cover window CW may be disposed on the display panel 10, and a protection layer PL may be disposed on the cover window CW. It will be understood that a touch sensor layer and/or an optical functional layer may be disposed between the display panel 10 and the cover window CW. The cover window CW and the protection layer PL may be disposed to cover the entire surface of the folding area FA and the non-folding area NFA of the display panel 10.

In addition, the second support portion 600 may be disposed under the first support portion 500. In an embodiment, the second support portion 600 may be adhered to the first support portion 500 by using the adhesive member. In this case, the second support portion 600 may include a fourth support member 610 disposed under the first support member 510, and a fifth support member 620 disposed under the second support member 520.

Figure 12:
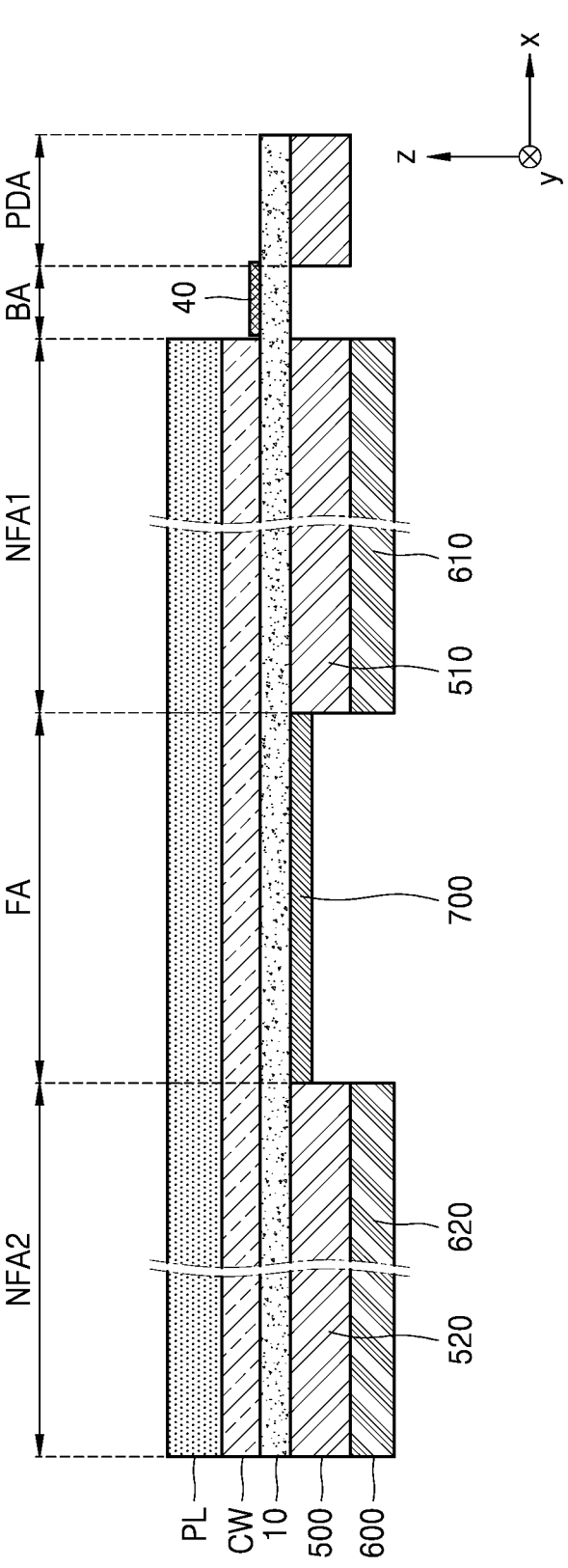

Referring to FIG. 12, the folding protection portion 700 may be disposed at a lower portion of the display panel 10 in the folding area FA, and the bending protection portion 40 may be disposed at an upper portion of the display panel 10 in the bending area BA. In this case, the folding protection portion 700 may be disposed between the first support member 510 and the second support member 520 as described above. Also, it will be understood that the folding protection portion 700 may be formed as a single member or may be formed as different members of the first folding protection portion 710 and the second folding protection portion 720 that are continuously stacked to each other in a thickness direction (z direction).

Figure 13:
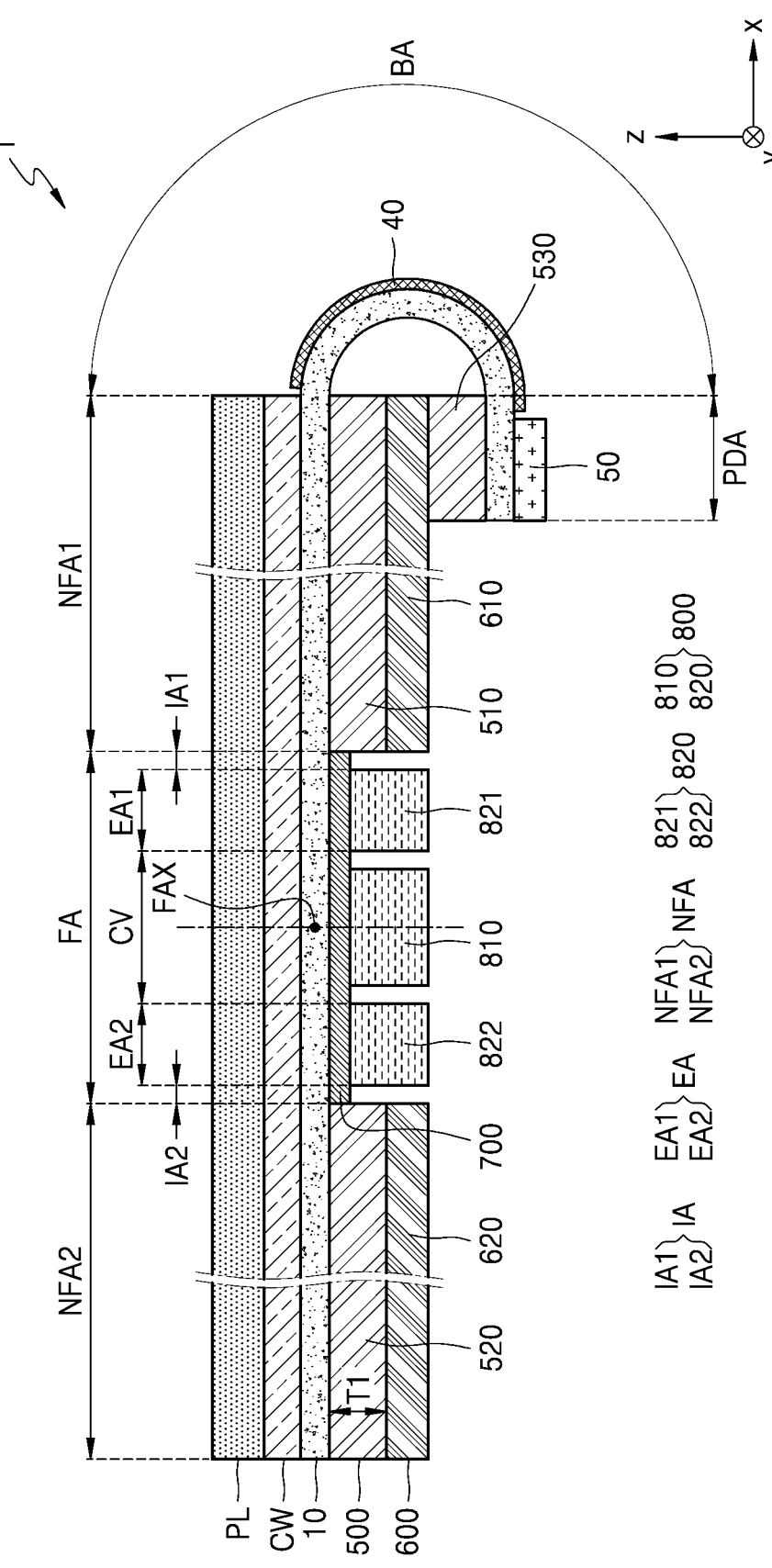

Referring to FIG. 13, the display panel 10 may be bent in the bending area BA. In this case, at least a portion of the lower surface of the display panel 10 may face each other, and the pad area PDA of the display panel 10 may be below other portions of the display panel 10 (in −z direction in FIG. 13). Also, the third support member 530 may be disposed to face the first support member 510.

Next, the folding support portion 800 may be disposed under the folding protection portion 700. In this case, the lower surface of the folding support portion 800 may be disposed in substantially the same plane as the lower surface of the second support portion 600. Thus, a step height at a boundary between the non-folding area NFA and the folding area FA may be effectively prevented from occurring.

Although the method for manufacturing the display apparatus shown in FIG. 5 has been described above as an example, it will be understood that the method for manufacturing a display apparatus can be similarly implemented to manufacture the display apparatus shown in FIGS. 7 to 8.

According to one or more embodiments, a display apparatus having no complex structure and being robust to impact and a method of manufacturing the display apparatus can be provided.

Also, a display apparatus for providing a uniform surface in a folding area and a method of manufacturing a display apparatus can be provided.

Also, a display apparatus in which a manufacturing process is simplified and manufacturing cost may be reduced, and a method of manufacturing the display apparatus can be provided.

The effects of the present disclosure are not limited to the above-mentioned effects, and other effects not mentioned can be clearly understood by those of ordinary skill in the art from the description of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a display panel comprising a folding area and a non-folding area at opposite sides of the folding area, wherein the folding area includes a curvature area, an inflection area at opposite sides of the curvature area, and an extension area between the curvature area and the inflection area, the inflection area is a border area between the folding area and the non-folding area, the display panel is foldable in the folding area, and, in a folded state, the display panel is bent in a concave direction in the curvature area and the extension area and bent in a convex direction in the inflection area;
support portions directly disposed at a bottom surface of the non-folding area, not the folding area, of the display panel, and being spaced apart from each other with the folding area therebetween; and
a folding protection portion directly disposed at a bottom surface of the folding area, not the non-folding area, of the display panel, disposed between and directly attached to the support portions and including a different material from the support portions,
wherein a thickness of the folding protection portion is less than a thickness of each of the support portions.

2. The display apparatus of claim 1, wherein the thickness of the folding protection portion is less than or equal to ½ of the thickness of each the support portions.

3. The display apparatus of claim 1, wherein the thickness of each of the support portions is about 200 micrometers (μm) to about 1000 μm.

4. The display apparatus of claim 1, wherein the thickness of the folding protection portion is about 10 μm to about 100 μm.

5. The display apparatus of claim 1, wherein a modulus of the folding protection portion is about 100 megapascals (MPa) to about 10 gigapascals (GPa).

6. The display apparatus of claim 1, wherein the support portion each comprises a glass material, and the folding protection portion comprises at least one of acryl, urethane, epoxy, silicon, and polyimide.

7. The display apparatus of claim 1, wherein the folding protection portion comprises a first folding protection portion disposed at a lower portion of the display panel and a second folding protection portion disposed at a lower portion of the first folding protection portion, in the folding area.

8. The display apparatus of claim 7, wherein a modulus of the first folding protection portion is about 0.01 MPa to about 1 MPa, and a modulus of the second folding protection portion is about 100 MPa to about 10 GPa.

9. The display apparatus of claim 7, wherein a thickness of the first folding protection portion is less than or equal to ½ of a thickness of the second folding protection portion.

10. The display apparatus of claim 1, further comprising a folding support portion disposed at a lower portion of the folding protection portion in the folding area.

11. The display apparatus of claim 10, further comprising a slit plate disposed between the folding protection portion and the folding support portion and comprising a plurality of opening patterns.

12. The display apparatus of claim 1, wherein the non-folding area comprises a first non-folding area at a first side of the folding area and a second non-folding area at second side of the folding area, the second side is opposite to the first side with respect to the folding area, the display panel further comprises a bending area connected to the first non-folding area and bent, and a pad area connected to the bending area and disposed to face the first non-folding area, and the support portions comprise a first support member disposed to correspond to the first non-folding area, a second support member disposed to correspond to the second non-folding area, and a third support member disposed to correspond to the pad area.

\* \* \* \* \*